460-71 EX
M7843 OR X 9,635
9635X
G. Beaumont,
Thrashing Machine.
Patented May 6, 1836.
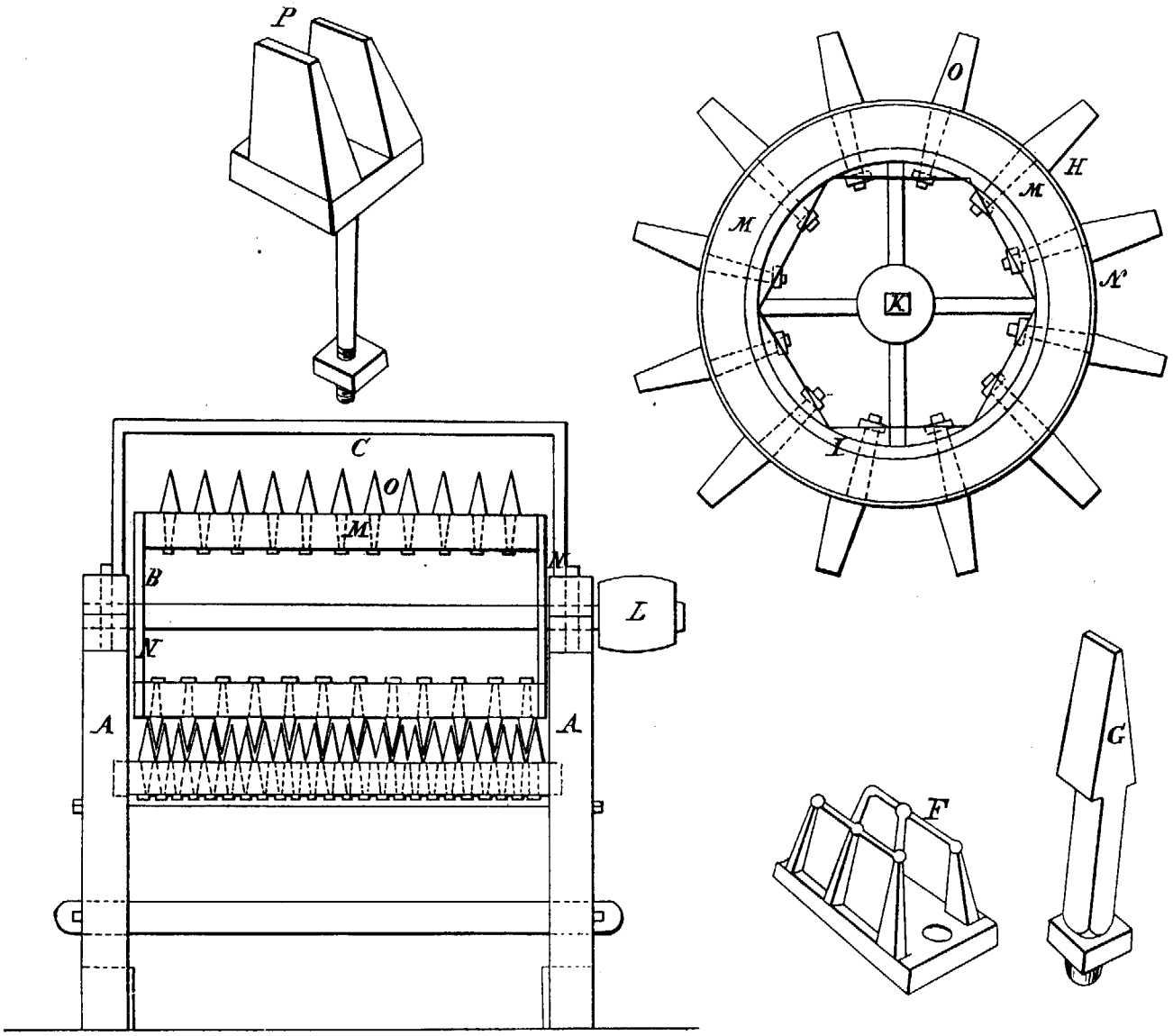

9635X

May 6. 1836

George Beamont. Westmoreland Co. Penn

Letters Patent

The schedule referred to in these Letters Patent and making part of the same
containing a description in the words of the said Geo. Beamont himself
of his improvement in the wedge Beater Threshing Machine.

Be it known that I George Beamont of near Mount Pleasant Westmore
land County and State of Pennsylvania have made an improvement in
the machine for threshing Grain and hulling Clover seed called Beamonts
wedge Beater threshing machine which is described as follows, reference
being had to the annexed drawings of the same machine a part of this spe
cification. A. represents the frame B. the [illegible] C. the cap or cross [illegible]
which are made in the usual manner; The concave or bed D. is made
of two concave staves E. let into channels in the sides of the frame; The
teeth or beaters of the concave are cast in sections each containing one,
two or more teeth of a wedge like form as represented at F. and are screwed
to the staves of the concave. The beaters of the concave may however be made
of wrought Iron as viewed at G. with a shank having a screw cut there
on which shank passes through the concave and is made secure by screw
ing a nut on the end of it. The concave may also be composed of alternate
rows of these wrought and cast iron Beaters.
The cylinder H. is composed of two circular cast iron rings I which I
each supported by four arms having a wrought iron shaft K. passing
thro' the centre of their intersection with turned journals running in
suitable metallic Boxes on the sides of the frame one end of the shaft project
ing beyond the side of the frame upon which is fixed the driving
pulley L. around these rings are placed the staves M. which
are bound together by two strong iron bands N. driven on their
ends. The beaters O. of the cylinder are made similar to those of the
concave and are fastened in like manner. Or they may be cast
in sections as represented at P. with a round opening in each 410. 9635X for a wrought iron bolt which passes through the same [illegible] through the Stave and is secured by a nut on the inside — the section being also let into a countersink in the face of the Stave — Two rows of beaters are arranged on each Stave in such manner that they work between the Beaters of the concave without touching and being of a wedgelike form they may be brought nearer to or receded farther from each other by simply raising the side pieces of the frame which support the Shaft of the cylinder: The Beaters of the cylinder as well as those of the concave may be arranged in alternate rows of cast and wrought iron Beaters as may be preferred. The Machine is fed and operated in the usual manner — All that I claim as my invention and desire to secure by Letters Patent consists in the peculiar formation of the Beaters as herein described Witnesses
Wm P. Elliot
W. Thompson George Beaumont Exd
[illegible]

[illegible]